Patented July 12, 1932

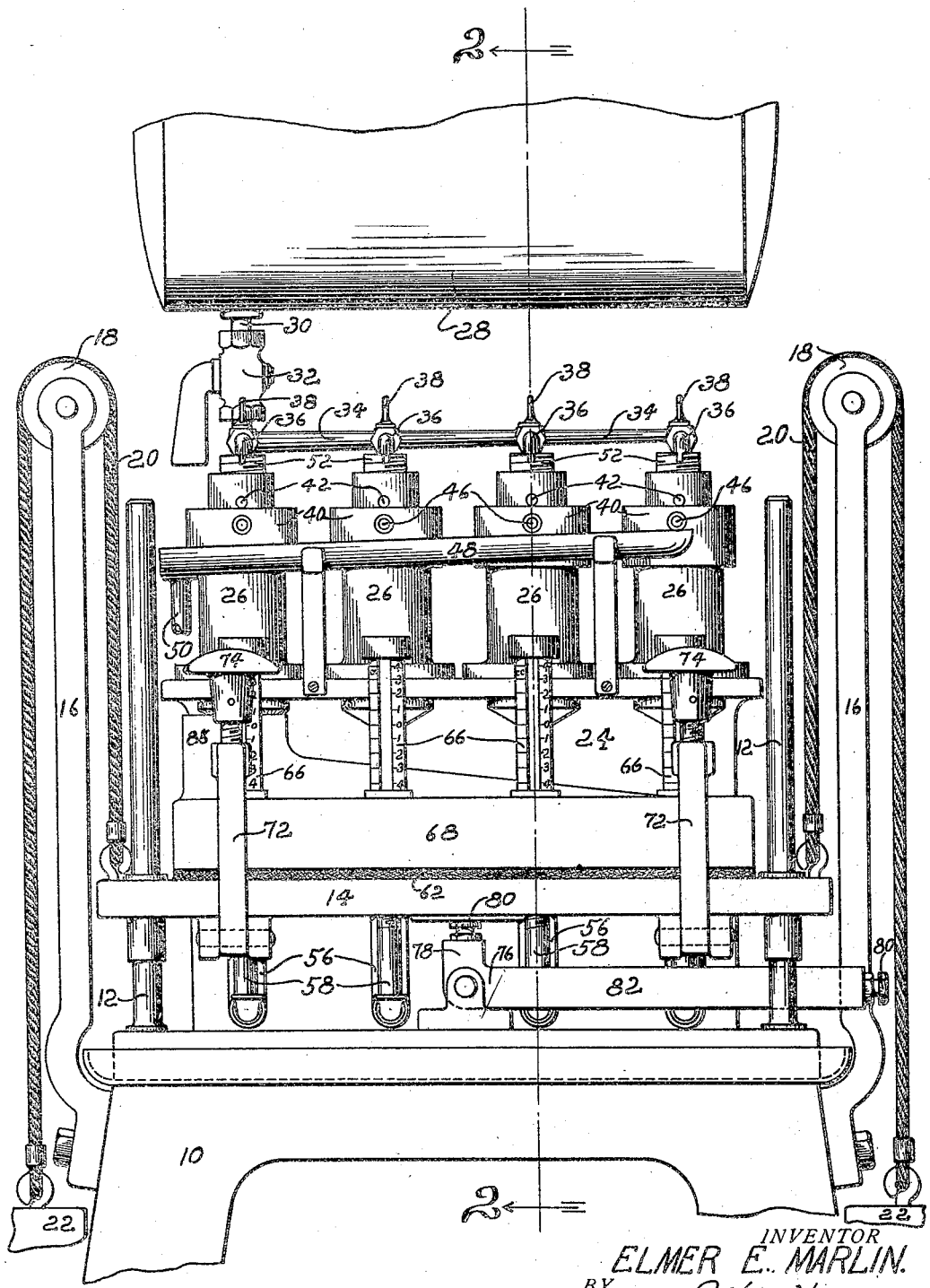

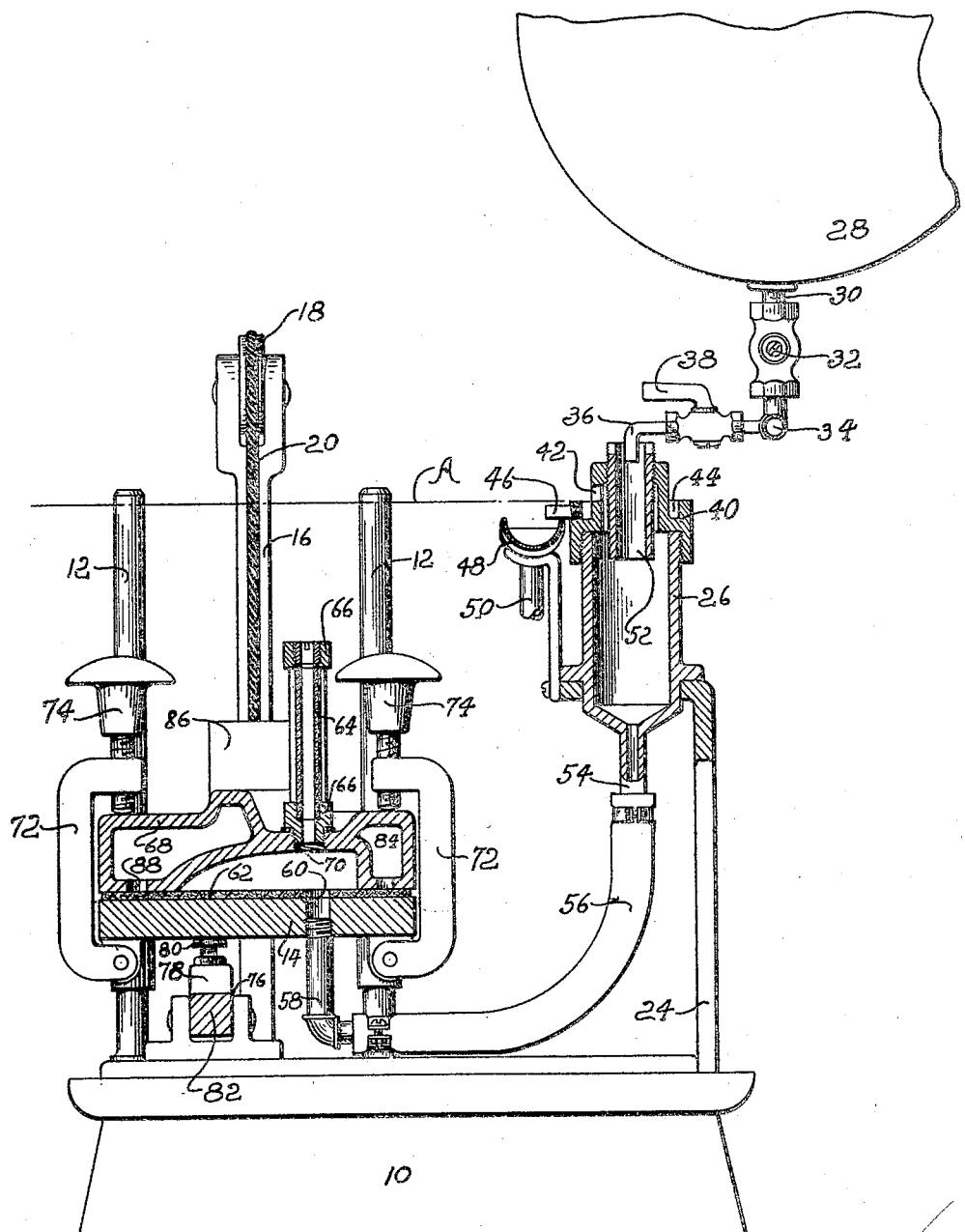

1,867,367

UNITED STATES PATENT OFFICE

ELMER E. MARLIN, OF DETROIT, MICHIGAN

MEASURING DEVICE

Application filed October 13, 1927. Serial No. 226,003.

This invention relates to a device for measuring the volume of a chamber, and is illustrated as embodied in a device for measuring the volume of a chamber having irregular surfaces such as the combustion chamber of a cylinder head for internal combustion engines.

An important object of the invention, is to fill the chamber with a liquid having a given volume which is greater than the volume of the chamber and measure the amount of overflow in a restricted chamber or passage.

In the manufacture of cylinder heads it is important that the combustion chambers are equal in volume to insure uniform combustion in each chamber. It is expensive to accurately machine the surfaces of a combustion chamber due to its irregular surfaces and such machining is not necessary other than to provide uniform volumes in a head having a plurality of chambers. The cast chambers, when uniform, are satisfactory. If it is found that one chamber is smaller than another its surface may be ground by an inexpensive method thus providing uniform chambers without machining all of the chambers.

Another object of the invention is to conduct the liquid into and out of the chambers by gravity, as for example, by raising the chambers to be measured above a liquid supply and lowering it below the supply so that the liquid from the supply flows by gravity into the combustion chamber and restricted passage.

Other objects and advantages will more fully appear from the following description taken in connection with the accompanying drawings in which:

Fig. 1 is an elevation of the front of a machine designed for measuring the volume of combustion chambers in a cylinder head;

Fig. 2 is a sectional view on line 2—2 of Fig. 1, parts being in elevation.

Referring to the drawings, a base 10 has been provided with upright guides 12. A plate 14 is mounted on the guides 12 and adapted to reciprocate thereon. Brackets 16 extending upwardly from the base 10 are provided with rollers 18 at the top thereof forming guides for cables 20. Each cable 20 has one end secured to the plate 14 and its opposite end is secured to a weight 22 so that the plate 14 and its associated parts, hereinafter more fully described, may be balanced and freely moved upwardly or downwardly.

A support 24 is secured to the base 10 and a plurality of chambers 26 are supported thereon. A liquid reservoir 28 is positioned above the chambers 26 and a conduit 30 provided with a valve 32 conducts the liquid to a distributing conduit 34 having passages 36 adapted to deliver liquid into each of the chambers 26. A valve 38 may be placed in each passage 36 to regulate the flow of liquid into each chamber separately.

Each chamber 26 has been shown cylindrical and a detachable head 40 is provided with an overflow passage 42 communicating with the interior of the chamber 26. An annular groove 44 below the overflow passage 42 catches the overflow of liquid and a pipe 46 carries the liquid from there to a trough 48 below each of the overflow pipes where it is drained off thru a pipe 50. Screwthreaded in the head 40 is a member 52 adapted to be adjustably positioned in the chamber 26 to vary the volume thereof. If the member 52 is screwed downwardly the liquid in the chamber is displaced thereby reducing the volume of liquid therein. The member 52 has been shown hollow to permit the liquid from the reservoir 28 to enter the chamber 26 therethru.

The lower end of the chamber is formed, as at 54, to receive a flexible conduit such as a hose 56 leading to a conduit 58 communicating with an opening 60 thru the plate 14. The chamber to be measured is placed on the plate 14 over the opening 60 and a gasket 62, preferably of leather, is placed between the plate and edge of the chamber to insure a good seal therebetween. Screwthreaded in an upper opening of the chamber to be measured is a metering device such as a graduated restricted passage. The device shown consists of a glass tube 64 supported at its opposite ends by a metallic cage 66, one end of which is screwthreaded to fit the opening of the chamber. The cage 66 is provided with suitable graduations by which the level and volume of the liquid in the tube 64 may be accurately determined. In measuring the combustion chambers of a cylinder head such as illustrated at 68, the metering device is screwthreaded into the spark plug opening 70.

Clamps 72 have been pivoted on the lower side of the plate 14 which may be swung over the head 68 and screwthreaded members 74 securely hold the head in sealed position against the gasket 62 on the plate 14 with the combustion chamber over the opening 60.

A right angle arm 76 is pivoted on the base 10 and adapted to support the plate in either of two positions. A short arm 78, having an adjustable end in the form of a set screw 80, is adapted to support the plate in its lower position and a longer arm 82 is adapted to support the plate in a predetermined upper position. An adjustable end has also been provided on this longer arm to position the upper surface of the gasket on the line A or in horizontal alignment with the lower portion of the overflow 42.

In the operation of the device, the plate 14 is raised and the longer arm 82 is swung to an upright position supporting the plate. The chambers 26 are then filled with a liquid to overflowing, whereupon the hose 56, conduit 58 and opening 60 is filled with liquid, the latter seeking a level flush with the upper surface of the gasket 62. The head or other chamber to be measured is tightly secured to the plate 14 and the plate and head is then lowered to the position shown on the drawings, whereupon the liquid, again seeking its own level, fills the chambers of the head and rises in the glass tubes 64. The volumes of the chambers of the head may be conveniently compared by observing the liquid levels in the tube 64 for as equal volumes of liquid are supplied to the chambers the difference in their volume will be proportional to the difference in the excess liquid in the respective tubes. The exact volumetric differences of the chambers may be ascertained by the volumetric graduations on the cage 66.

It will be understood that the device may be used to accurately determine the volume of the chamber by supplying the chamber 26 with a known quantity of liquid and that while the invention has been shown as embodied in a device for comparing the combustion chambers of a cylinder head, it may be readily used for measuring the volume of the water jacket 84 or other chambers. If it is desired to measure the volume of a water jacket the metering device may be placed in the water outlet pipe 86 and the opening 60 positioned to communicate with openings 88 in the head 68.

While I have described what I deem to be the preferred embodiment of my invention it is to be understood that various changes may be made in the arrangement, combination and construction of the various parts of my improved device without departing from the spirit of my invention, and it is not my intention to limit its scope other than by the terms of the appended claims.

What I claim is:

1. A device of the class described comprising, a base, a liquid reservoir supported on said base, vertical guiding means on said base, a plate vertically movable on said guiding means, securing means carried by said plate and adapted to secure a chambered member on said plate, and a conduit forming a communication between said liquid reservoir and the interior of said chambered member.

2. A device of the class described comprising, a support, vertical guiding means on said support, a liquid reservoir having an overflow passage and supported adjacent the upper portion of said guiding means, a plate vertically movable on said guiding means, a short arm below said plate to support it in its lower position, a longer arm below said plate to support it in its upper position with the upper surface of said plate in the same horizontal plane as the lower portion of said overflow passage, securing means carried by said plate and adapted to secure a chambered member on said plate, and a conduit forming a communication between said liquid reservoir and the interior of said chambered member.

3. A device of the class described comprising a support, vertical guiding means on said support, a reservoir supported adjacent the upper portion of said guiding means, a plate vertically movable on said guiding means, securing means carried by said plate and adapted to secure on said plate a member having an open bottom chamber to be measured, a conduit communicating directly with said liquid reservoir and with the interior of said chambered member through the bottom of said chambered member, and a liquid measuring device above said member and communicating with the interior thereof for holding above said member the liquid of said reservoir that exceeds the capacity of the latter.

4. A device of the class described comprising a support, a liquid reservoir adapted to contain a given volume of liquid, a plate for receiving a chambered member having an opening in its lower surface, the volume of which is to be measured, means shiftably supporting one of said elements so as to permit vertical movement thereof with respect to the other, a conduit communicating with said liquid reservoir and directly with the interior of said chambered member through the lower wall of said chambered member, and means above said chambered member for holding and indicating the quantity of the liquid of said reservoir that exceeds the capacity of said chambered member.

5. A device of the class described comprising, a base, a liquid reservoir supported on said base, and having an overflow passage, means for varying the volume of said reservoir, vertical guiding means on said base, a plate vertically movable on said guiding means, securing means carried by said plate and adapted to secure a chambered member on said plate, a flexible conduit forming a communication between said liquid reservoir and the interior of said chambered member, and means for indicating the amount of liquid conducted from said reservoir to said chambered member.

6. The method of measuring the internal volume of a chambered member which consists in providing, at a predetermined level, known quantities of liquid of substantially greater volume than the volume of said chambered member, placing the lowest portion of the interior of said chambered member on a level with the liquid in said reservoir and in communication with the latter, lowering said chambered member to permit the liquid in said reservoir to flow by gravity into said chambered member, forming a liquid head above said chamber and in communication therewith of the liquid of said reservoir which is in excess of the capacity of said chambered member, and measuring said excess volume.

7. The method of comparing the volumes of the combustion chambers in a cylinder head which consists in providing a number of liquid receiving reservoirs having equal volumes of greater capacity than said combustion chambers and corresponding in number to the number of combustion chambers in said head, placing the lowest portion of said combustion chambers on a level with the level of the liquid in said reservoirs and each in separate communication with said reservoirs, lowering said chambers to permit all the liquid in said reservoirs to flow by gravity into said chambers, collecting the liquid which is in excess of the volumes of said chambers in restricted metering devices above said chambers, the difference of the liquid level in said metering devices being proportional to the difference in volume of said chambers.

8. The method of comparing the volumes of the chambers of a cylinder head which consists of forming a liquid tight seal between said chambers, providing separate equal quantities of liquid, one in communication with each chamber, said quantities being substantially greater in volume than the volume of said chambers, introducing into each chamber a sufficient amount of the liquid of each separate quantity respectively to completely fill each chamber, and forcing the excess liquid of each of said separate quantities into uniform liquid head measuring devices while said chambers are filled and in communication with said measuring devices so as to indicate the difference between the volumes of said chambers by the level of liquid in said devices.

9. A device of the class described comprising a support for a chambered cylinder head, means for forming a liquid tight seal between the chambers of said head, apparatus communicating with said chambers for feeding equal amounts of liquid to each of said chambers, said amounts of liquid being greater in volume than the volume of said chambers respectively, and means communicating with the upper extremities of said chambers respectively for receiving the liquid which is in excess of the volume of said chambers and holding the same above said upper extremities when said chambers are completely filled.

10. A device of the class described comprising a shiftable support for a chambered cylinder head, means for forming a liquid tight seal between the chambers of said head, apparatus communicating with said chambers for feeding equal amounts of liquid to each of said chambers, said amounts of liquid being greater in volume than the volume of said chambers respectively, means communicating with the upper extremities of said chambers respectively for receiving the liquid which is in excess of the volume of said chambers and holding the same above said upper extremities when said chambers are completely filled, a member on said means having indicia thereon from which the volume of the excess liquid may be conveniently calculated, and means for moving said shiftable support to selectively fill and empty said chambers.

11. A device of the class described comprising a support for a chambered cylinder head, means for forming a liquid tight seal between the chambers of said head, a plurality of receptacles, one communicating with each of the chambers of said head for introducing into said chambers equal quantities of liquid of greater volume than said chambers, and a plurality of transparent standpipes of substantially equal diameter, one communicating with the upper extremity of each of said chambers for receiving the liquid which is in excess of the capacity of said chambers and for holding the same above the upper extremity of said chambers, the difference in the liquid level of said standpipes being proportional to the difference in volume of said chambers.

ELMER E. MARLIN.